Oct. 3, 1939.  M. H. HANSEN  2,175,024
WEIGHING SCALE
Filed June 25, 1938  2 Sheets-Sheet 1

Inventor
Maruis H. Hansen
BY
Parker, Carlson, Pitzner & Hubbard
Attorneys.

Oct. 3, 1939.    M. H. HANSEN    2,175,024
WEIGHING SCALE
Filed June 25, 1938    2 Sheets-Sheet 2
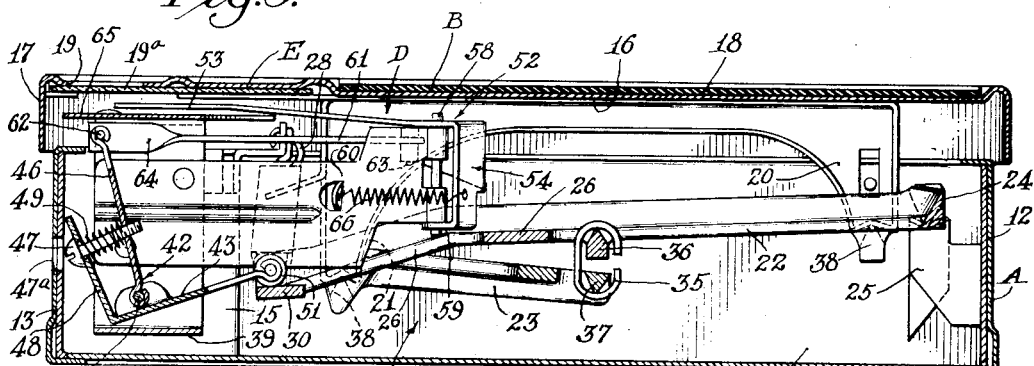
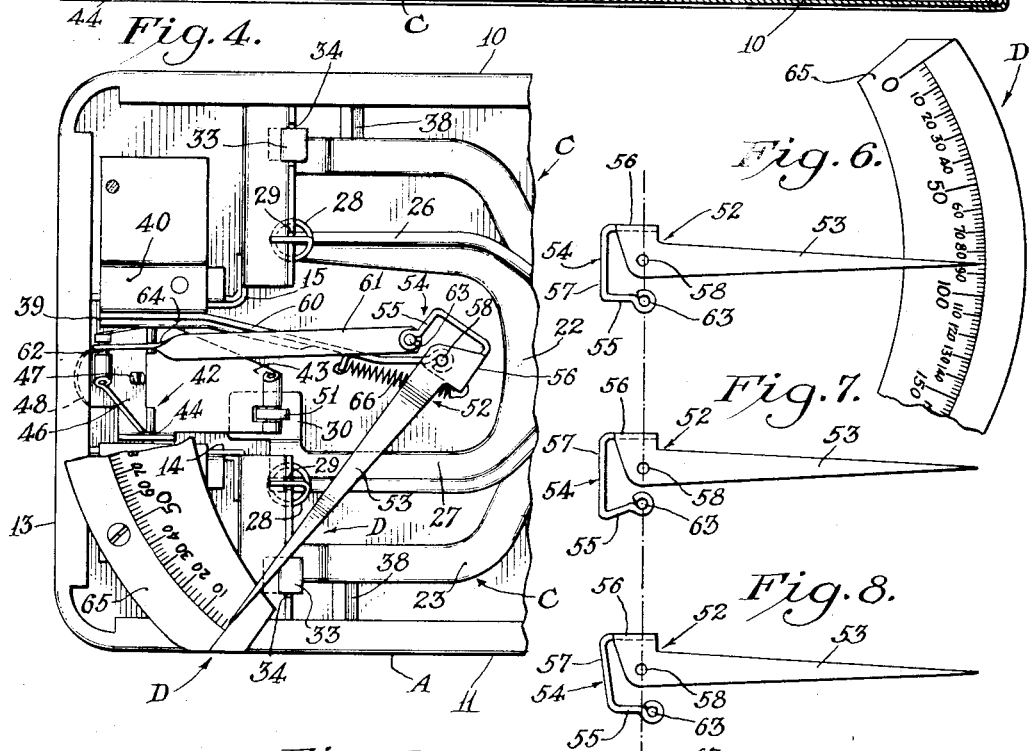
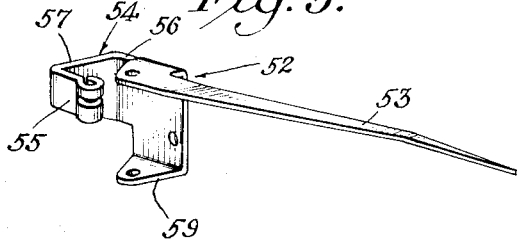
Inventor
Maruis H. Hansen
BY
Parker, Carlson, Pitzner & Hubbard
Attorneys.

Patented Oct. 3, 1939

2,175,024

UNITED STATES PATENT OFFICE 2,175,024

WEIGHING SCALE

Marius H. Hansen, Chicago, Ill., assignor, by mesne assignments, to Hanson Scale Company, a corporation of Illinois Application June 25, 1938, Serial No. 215,719

10 Claims. (Cl. 265—68)

The invention relates generally to weighing scales and has particular utility as applied to scales of the class commonly known as "bath room" scales although some of the features of the invention are also applicable to other types or classes of scales.

The general object of the invention is to provide an improved weighing scale which is rugged in construction and which preferably embodies no toothed or gear parts, which are likely to get out of order as a result of rough usage, but which can, on the other hand, be made of simple and cheaply formed linkage and lever elements.

Another object of the invention is to provide a weighing scale embodying an improved and simplified form of indicator mechanism which can be readily adjusted during the initial assembly of the device so as to respond accurately to the weighing mechanism. Preferably the construction is such that this adjustment may be achieved by a simple bending of suitable sheet metal parts included in the device as distinguished from the use of adjustment screws and like complications.

Another object of the invention is to provide an improved form of indicator mechanism particularly adapted for mounting within a shallow casing with a top weight-receiving platform as, for example, in a bath room scale.

Still another object of the invention is to provide a weighing scale embodying an improved arrangement for taking up play or looseness in the parts so that various elements need not be connected by precision-fitted joints but can, on the other hand, be joined by loose pivot connections or the like without interfering with the accuracy of the weighing operations.

The invention also resides in the improved unit type assembly for the indicator and motion-transmission mechanism.

Further objects and advantages of the invention will become apparent as the following description proceeds taken in connection with the accompanying drawings in which:

Fig. 3 is an enlarged vertical longitudinal sectional view of the scale of Fig. 1;

Fig. 4 is an enlarged partial plan view with the top removed;

Fig. 5 is a detail perspective view of the pointer assembly included in the weighing scale of Fig. 1;

Figs. 6, 7 and 8 are generally diagrammatic views of the pointer mechanism illustrating particularly the method of accomplishing its initial adjustment.

Figure 1:
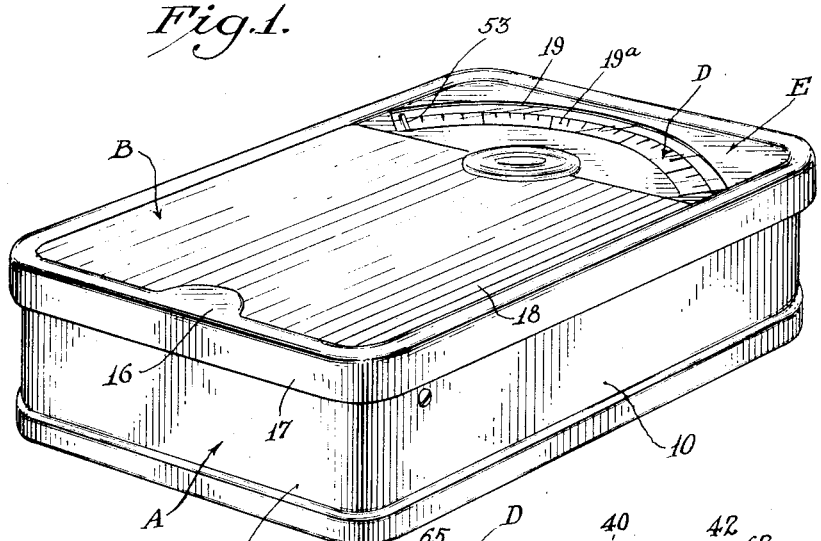
Figure 1 is a general perspective view of a weighing scale embodying the invention.
Figure 2:
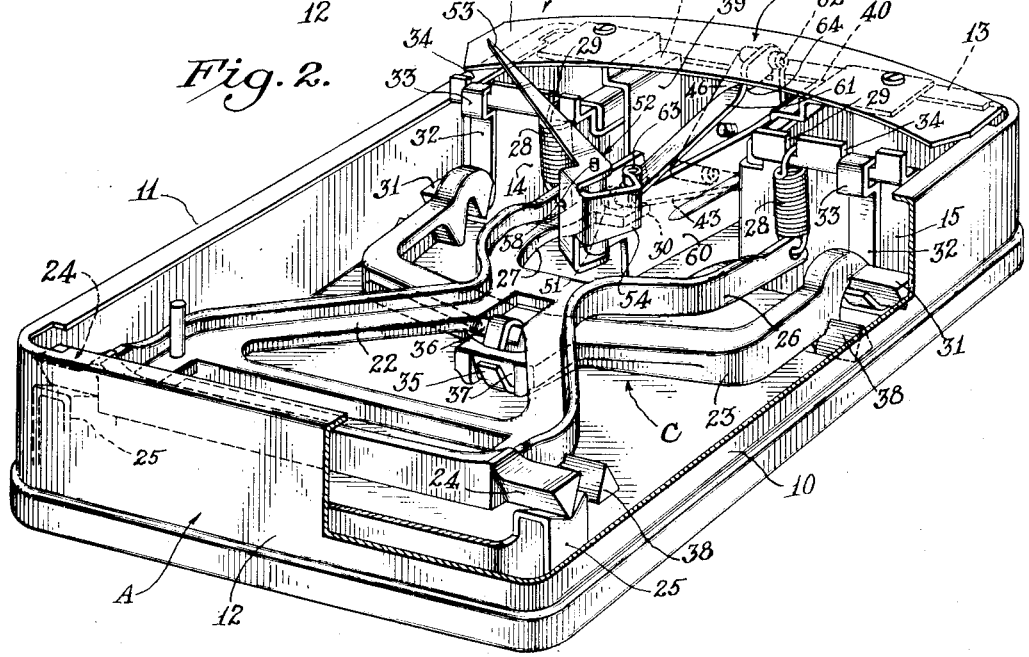
Fig. 2 is an enlarged perspective view, partly in section, of the scale shown in Fig. 1 with the top removed.

Referring more particularly to Figs. 1 and 2 of the drawings, the scale selected to illustrate the invention is of the so-called bath room type and comprises generally a casing or base A, a platform B, a weighing mechanism C enclosed within the base and arranged to support the platform, and an indicator mechanism D operatively associated with the weighing mechanism. The motion-transmitting mechanism, connecting the weighing mechanism and the indicator mechanism, is preferably fashioned as a unitary structure with the indicator mechanism so as to form a separate removable unit as is hereinafter described in greater detail. As to this last feature, the unitary structure noted is in general an improvement on that described and claimed in my co-pending application Serial No. 173,739 filed November 10, 1937. The indicator mechanism is covered by a windowed housing E, which in the present instance is formed as an integral extension on the platform B, although if desired this housing or cover may be made separate from the platform and secured to the base A.

In the form of scale herein shown the casing A is of rectangular shape and includes side walls 10 and 11 as well as front and rear end walls 12 and 13. The casing may be fashioned as a stamping from a single strip of sheet metal with its ends riveted or otherwise secured together adjacent the center of the rear end wall 13. Generally V-shaped sheet metal webs 14 and 15 are fixed in the rear corners of the base A in order to support the indicator mechanism D as is hereinafter described.

As was previously noted, the weight-receiving platform B and indicator housing E have been shown herein as fashioned integrally. In particular they are formed by a single sheet metal plate 16 of rectangular form bordered by an integral depending flange or skirt 17 which telescopes about the walls of the casing A in spaced relation thereto. A suitable rubber pad 18 overlies the top of the platform B for a person using the scale to stand upon. At the opposite end of the plate 16 an arcuate window or aperture 19 overlies the indicator mechanism D so that the user of the scale can read the figure shown by the indicator mechanism while standing upon the platform B. The window 19 may be covered by a suitable glass 19ª. Depending sheet metal legs 20 and 21 (Fig. 3) are welded or otherwise fixedly secured to the bottom of the platform plate 16 in order to support the same on the weighing mechanism C.

The weighing mechanism C comprises two levers 22 and 23 (Fig. 2). The lever 22 is provided at its forward end with two downwardly facing knife edge bearings 24 adapted to be supported in V-shaped bearings 25 mounted on the front wall 12 of the base, and its rearward end is bifurcated to form spaced arms 26 and 27 extending adjacent the webs 14 and 15. These arms are yieldably supported on the flanged upper edges of the webs 14—15 by means of resistor springs 28 hooked in suitable notches 29 fashioned in the flanges on the webs 14—15. An inwardly offset lug 30 (Fig. 4) on the arm 27 is arranged to project between the webs 14 and 15 for cooperation with the indicator mechanism D in a manner to be described presently.

The lever 23 is in the form of a yoke and each leg is provided with a knife edge bearing 31 (Fig. 2) adapted to rest in a V-shaped bearing formed on the lower end of a hanger 32. Each of the hangers 32 is formed of an integral piece of sheet metal, the lower end of which is bent to form the V-shaped bearing for the lever while the upper end is bent to form a hook 33 adapted to engage in one of the notches 34 fashioned in the flanges on the webs 14—15. The forward end of the lever 23 is suspended from the mid point of the lever 22 by means of a loop or ring 35 engaging knife edge bearings 36 and 37 on the respective levers as shown in Fig. 3.

The levers 22 and 23 are formed with suitable upwardly facing knife edge bearings 38 (Fig. 3) for supporting the platform B. To this end the legs 20 and 21 on the lower side of the platform rest on these knife edge bearings 38. When a weight is placed on the platform, the levers 22 and 23 are rocked about their fulcrums, and the free end of the first mentioned lever, terminating in the lug 30, is depressed in proportion to the weight on the platform.

To facilitate manufacture and assembly of the scale, the indicator mechanism D and its associated motion-transmission mechanism are preferably fashioned as a single unitary structure. In the illustrative construction (Fig. 2) this unitary structure embodies a U-shaped supporting base 39 fashioned as a stamping from sheet metal. This base 39 is dimensioned to be received between the opposed walls of the base webs 14 and 15. Flanges 40 on the upper ends of the arms of the U-shaped base 39 may be riveted or otherwise secured to the webs 14—15 in order to hold the base 39 in position. All of the parts of the indicator mechanism as well as its associated motion-transmission mechanism are carried by the single U-shaped base member 39.

For transmitting motion from the vertically movable lug 30, on the end of the weighing mechanism lever 22, to the indicator mechanism D (Fig. 3), a first bell crank, designated generally by the numeral 42, is mounted on the base 39 for oscillation about a horizontal axis. This bell crank 42 includes a generally horizontal arm 43 stamped from sheet metal and pivoted between the upright arms of the base 39 by a pin 44 passing from integral ears on the arm 43 and journaled in side arms of the base. The second arm 46 of the bell crank 42 is generally upright and is arranged for angular adjustment with respect to the first arm 43 in order to adjust the zero setting of the indicator mechanism as is hereinafter described. For this purpose the arm 46 is also fashioned as a sheet metal stamping pivoted on the pin 44. An adjusting screw 47 is threaded in the upright bell crank arm 46 and passes through a hole in an upright ear 48 on the rear end of the horizontal bell crank arm 43. A helical compression spring 49 is interposed between the adjacent faces of the ear 48 and the upright arm 46. This spring presses the arm 46 outwardly and the threads on the end of the screw 47 are mashed so as to form a stop. Accordingly the angle between the bell crank arms 43 and 46 can be adjusted by threading the screw 47 in or out. The free end of the horizontal bell crank arm 43 carries a roller 51 which is urged by gravity into engagement with the top of the lug 30 on the weighing mechanism lever 22. It will thus be seen that the bell crank 42 is oscillated about its horizontal pivotal axis in response to vertical displacement of the lug 30 during the weighing operation.

The indicator mechanism D shown herein embodies a structure which is in effect a second bell crank and which has been designated by the numeral 52 (Fig. 4). This second bell crank 52 is pivoted about a vertical axis rather than a horizontal axis as in the case of the first bell crank 42. In particular this second bell crank 52 comprises an arm 53 in the form of an indicator pointer, and a second arm formed by an integral U-shaped sheet metal extension 54 fashioned on the butt end of the pointer 53. This U-shaped extension comprises (Fig. 5) side arms 55 and 56, generally longitudinally aligned with the pointer 53 and at one end a base 57. The use of the extension 54 in the initial or factory adjustment of the scale is hereinafter described in greater detail. Pivotal support is afforded the pointer 53 by a pin 58 extending between the base of the pointer and an ear 59 on the bottom of the extension side arm 56 (Figs. 3 and 5), this pin being journaled in the outer end of a sheet metal bracket 60, which is spot welded or otherwise rigidly secured to the one leg of the supporting base 39. A long rigid sheet metal link 61 connects the upright arm 46 of the first bell crank with the outer end of the side arm 55 on the pointer extension 54. Pivotal connections at each end of the link 61 are formed by suitable pivot pins 62 and 63. The link 61 is twisted intermediate its ends as indicated at 64 since the axis of the pivot pins 62 and 63 are disposed at right angles with respect to each other.

Cooperating with the pointer 53 is a fixed indicator element or arcuate graduated indicator scale 65 (Fig. 4) which may be viewed through the housing aperture 19. This scale is fast on the flanges 40 fashioned on the upper ends of the supporting base 39. In view of the type of connecting linkage utilized between the weighing mechanism lever 22 and the pointer 53, graduations on the scale 65 are non-uniform. In general the smaller graduations are placed at the center of the scale and the graduations increase slightly in length toward the opposite ends thereof (see Fig. 6). The size of the graduations on the scale are, however, sufficiently uniform throughout its length that no difference between them is detected upon a casual observation of the actual scale.

In the preferred construction described above, it will be seen that no toothed or gear members are included and furthermore no yieldable connecting members or links are utilized. As a consequence the parts of the mechanism can be formed very cheaply as sheet metal stampings and furthermore the scale is sufficiently rugged in construction as to withstand hard or abusive usage. In order to avoid the necessity of precision fitting of the various pivotal joints, a tension spring 66 (Fig. 4) is utilized to urge the pointer 53 constantly in one direction. This spring has been shown as anchored at its opposite ends to the bracket 60 and to the pointer extension 54. This spring urges the pointer 53 in a clockwise direction so that it follows accurately any downward displacement of the weighing mechanism lever 22. By virtue of this constant bias on the pointer, any looseness or play in the pivotal connections of the motion-transmission connection is taken up.

In regular commercial production variations unavoidably occur in the strength of the resistor springs 28. Accordingly some initial or factory adjustment must be made of the scale to correlate the indicator mechanism D and the weighing mechanism C. In the construction shown, this initial adjustment can be readily accomplished by merely bending certain of the indicator parts as is hereinafter described and without making any changes in or adjustment of the resistor springs.

As a preliminary to the initial adjustment referred to above, the pointer 53 is adjusted to the zero position when the scale is unloaded. For this purpose it is only necessary to turn the adjusting screw 47, by a screw driver inserted through an aperture 47$^a$ (Fig. 3) in the base, until the pointer is at exactly its zero position on the cooperating scale 65. The scale may then be checked for full load as, for example, by placing 250 pounds of weights on the platform B of the scale if the full scale registration is 250 pounds. In the event that the pointer 53 registers either above or below the corresponding 250 pound scale mark on the scale 65, the side arm 55 of the U-shaped extension 54 on the pointer is bent in or out as the case may be so as to displace the pivot point 63 toward or away from the pivot point 58, this adjustment being made in the direction indicated by the dot dash line 67 in Fig. 7. In other words the extension 54 may, for example, be distorted from the shape shown in Fig. 6 to that of Fig. 7. The effect of this adjustment is to change the length of one of the arms of the second or pointer bell crank 52. By means of this adjustment the displacement of the pointer 53 is changed until it corresponds exactly with the full load position on the scale 65.

Since the scale 65 is necessarily non-uniform, as is noted above, it may, in some instances, be necessary to adjust the pointer mechanism so that the point of minimum displacement of the pointer 53 for a given change of weight on the platform will correspond exactly with the point of minimum graduations or center point on the scale 65. This second adjustment is accomplished by bending the base 57 of the extension 54 on the pointer so that the pivot point 63 is in effect shifted above or below the dot dash line (Fig. 7) as may be required. For example, the extension 54 may be bent from the shape shown in Fig. 6 to that shown in Fig. 8. In other words, the angle between the two arms of the pointer bell crank 52 is adjusted but without changing the effective lengths of the bell crank arms. Since the extension 54 is fashioned of bendable sheet metal, the adjustments described can be very readily carried out in the factory during the assembly of the scale. After the adjustments are once made, there is no danger of their being inadvertently shifted or changed during subsequent use.

In the use of the scale, the platform B is subjected to the weight of the person or object to be weighed. The pressure upon the platform is transmitteed through the bearings 38 to the levers 22—23. The free end of the lever 22, carrying the lug 30, is thereby depressed against the tension of the resistor springs 28, the movement of the lever 22 being proportional to the weight on the platform. Depression of the lug 30 permits the free end of the arm 43 on the first bell crank 42 to fall so that the bell crank rocks on its pivot pin 44 in a clockwise direction (as viewed in Fig. 3). The tension spring 66 augments gravity in retaining the arm 43 in contact with the lug 30. Oscillation of the bell crank 42 shifts the link 61 axially thereby oscillating the second or pointer bell crank 52. The pointer 53, of course, indicates on the scale 65 the weight of the object which is depressing the platform B.

Although a particular embodiment of the invention has been shown and described in some detail for purposes of illustration there is no intention thereby to limit the invention to such embodiment but on the other hand the appended claims are intended to cover all modifications and alternative constructions falling within the spirit and scope of the invention.

I claim as my invention:

1. A weighing scale comprising, in combination, a weighing mechanism including a member movable a distance proportionate to the weight applied to said weighing mechanism, an indicator mechanism including a fixed arcuate scale element and a cooperating swingable pointer element, a pivotal support for said pointer element, a U-shaped sheet metal extension on said pointer disposed with said pivotal support at one end of one arm of said U-shaped extension and with both arms thereof extending generally longitudinally of said pointer, and means for connecting said weighing mechanism member to said extension at a connection point on the outer end of the second arm of said U-shaped extension, said extension being fashioned of bendable sheet metal whereby said point of connection may be adjusted both radially toward and away from said pivotal support and angularly about the same.

2. A weighing scale comprising, in combination, a weighing mechanism including a member movable a distance proportionate to the weight applied to said weighing mechanism, an indicator mechanism including a fixed element and a relatively oscillatable cooperating element, a pivotal support for said oscillatable element, a U-shaped sheet metal extension on said oscillatable member disposed with said pivotal support adjacent one end of one arm of said U-shaped extension, and means for connecting said weighing mechanism member to said extension at a connection point on the outer end of the second arm of said extension, said extension being fashioned of bendable sheet metal whereby said point of connection may be adjusted both radially toward and away from said pivotal support and angularly about the same.

3. A weighing scale comprising, in combination, a weighing mechanism including a member movable a distance proportionate to the weight applied to said weighing mechanism, an indicator mechanism including a fixed element and a relatively oscillatable cooperating element, a pivotal support for said oscillatable element, and means for connecting said weighing mechanism member in driving relation to said oscillatable element at a point laterally displaced from said pivotal support, said last named means being adjustable to shift said point of connection both radially toward and away from said pivotal support and angularly about the same.

4. A weighing scale comprising, in combination, a pivotally mounted bell crank having first and second arms, said first arm of said bell crank constituting a pointer of an indicator mechanism, a fixed arcuate scale cooperating with said pointer arm of said bell crank, a weighing mechanism, and movable means for connecting said weighing mechanism in operative relation with the second arm of said bell crank, said bell crank being adjustable not only to change the angle between the arms of said bell crank and thereby vary the point of minimum movement of said pointer arm in its path of movement but said bell crank being also adjustable to vary the effective length of said second arm of said bell crank between the point of pivotal support thereof and the point at which said weighing mechanism is connected thereto to vary the amplitude of movement of said pointer arm for a predetermined displacement of said movable means connecting said weighing mechanism.

5. A weighing scale embodying a weighing mechanism and an indicator mechanism including a fixed scale and a cooperating elongated sheet metal pointer characterized by the provision of an integral and bendable sheet metal U-shaped bracket on the butt end of said pointer with one arm of the bracket forming in general a longitudinal extension of the pointer, and means for pivotally supporting said pointer adjacent the end of said one arm and for pivotally connecting said weighing mechanism to the end of the other arm of said bracket.

6. A bath room type scale comprising, in combination, a shallow hollow base, a weighing mechanism within said base including a generally horizontal lever pivoted for movement about a horizontal axis and a spring connected to said lever and to said base for yieldably resisting downward movement of said lever, a weight-receiving platform carried by said lever, a first bell crank pivotally supported at one end of said casing for oscillation about a horizontal axis and provided with a generally upright arm and a generally horizontal arm, means for connecting said lever to said horizontal arm, a second bell crank supported within said casing for oscillation about a vertical pivotal axis, a link operatively connecting said upright arm and one arm of said second bell crank, an indicator pointer on the other arm of said second bell crank, and a fixed horizontal indicator scale cooperating with said pointer.

7. A weighing scale comprising, in combination, a weighing mechanism, a first bell crank pivoted for movement about a horizontal axis with one arm generally upright and the second arm generally horizontal, means for connecting said weighing mechanism to said horizontal arm, a second bell crank pivoted for movement about a vertical axis, a rigid link connecting said upright arm of said first bell crank to one arm of said second bell crank, and an indicator element operatively connected to the second arm of said second bell crank.

8. In a weighing scale the combination of a weighing mechanism embodying a vertically movable member, an indicator, a bell crank pivoted about a horizontal axis and having one arm thereof resting on said vertically movable member and urged by gravity into engagement therewith, means for operatively connecting said indicator and the other arm of said bell crank, said last named means including a member having a common pivot with said bell crank, and means for adjusting the angle between said last named member and said other bell crank arm.

9. In a weighing scale the combination with a weighing mechanism of a removable combined indicator and motion-transmission unit comprising an upright U-shaped sheet metal base, a bell crank pivoted between the side arms of said base adjacent the bottom thereof with one arm of said bell crank extending generally horizontal and the other generally upright, a horizontal supporting bracket on one of the vertical side arms of said U-shaped base extending laterally therefrom substantially above said horizontal bell crank arm, an indicator pointer pivotally supported on the outer end of said bracket for oscillation in a horizontal plane, a rigid link for operatively connecting said upright bell crank arm to said indicator element at a point laterally displaced from the point of pivotal support thereof, and an arcuate scale cooperating with said pointer and secured to the upper ends of the arms of said U-shaped base.

10. A weighing scale comprising, in combination, a weighing mechanism including a generally horizontal lever pivoted about a horizontal axis, a bell crank pivoted for movement about a horizontal axis and provided with a generally horizontal arm overlying said lever and a generally upright arm, a roller on said horizontal arm arranged to contact said lever by gravity, an indicator element pivoted for movement about a vertical axis, and a rigid link for operatively connecting said upright bell crank arm to said indicator element at a point laterally displaced from the point of pivotal support thereof.

MARIUS H. HANSEN.